(12) United States Patent
Traneus

(10) Patent No.: US 12,544,591 B2
(45) Date of Patent: Feb. 10, 2026

(54) SYSTEM, COMPUTER PROGRAM PRODUCT AND METHOD FOR ION-BASED RADIOTHERAPY TREATMENT PLANNING

(71) Applicant: RaySearch Laboratories AB, Stockholm (SE)

(72) Inventor: Erik Traneus, Uppsala (SE)

(73) Assignee: RaySearch Laboratories AB, Stockholm (SE)

( * ) Notice: Subject to any disclaimer, the term of this patent is extended or adjusted under 35 U.S.C. 154(b) by 1029 days.

(21) Appl. No.: 17/053,876

(22) PCT Filed: May 14, 2019

(86) PCT No.: PCT/EP2019/062377
§ 371 (c)(1),
(2) Date: Nov. 9, 2020

(87) PCT Pub. No.: WO2019/224054
PCT Pub. Date: Nov. 28, 2019

(65) Prior Publication Data
US 2021/0228906 A1 Jul. 29, 2021

(30) Foreign Application Priority Data
May 21, 2018 (EP) .................................. 18173400

(51) Int. Cl.
*A61N 5/10* (2006.01)
*G16H 20/40* (2018.01)

(52) U.S. Cl.
CPC .......... *A61N 5/1031* (2013.01); *G16H 20/40* (2018.01); *A61N 2005/1034* (2013.01); *A61N 2005/1087* (2013.01)

(58) Field of Classification Search
None
See application file for complete search history.

(56) References Cited

U.S. PATENT DOCUMENTS

| | | | |
|---|---|---|---|
| 2016/0059039 A1* | 3/2016 | Liu ....................... | A61B 34/10 600/1 |
| 2017/0004267 A1* | 1/2017 | Svatos ................... | G16H 20/40 |
| 2017/0304651 A1 | 10/2017 | Takayanagi et al. | |

(Continued)

FOREIGN PATENT DOCUMENTS

| WO | WO-2013/129258 A1 | 9/2013 |
|---|---|---|
| WO | WO-2017/216219 A1 | 12/2017 |

OTHER PUBLICATIONS

Batista, Vania, et al., "Planning strategies for inter-fractional robustness in pancreatic patients treated with scanned carbon therapy," Radiation Oncology (2017) 12:94, 9 pages.

(Continued)

*Primary Examiner* — Eliza W Osenbaugh-Stewart
(74) *Attorney, Agent, or Firm* — Faegre Drinker Biddle & Reath LLP

(57) ABSTRACT

Accumulated path length for ions that reach a particular area of a patient is used in dose planning as an indicator of plan robustness. Also, the magnitude of the variations of the accumulated path lengths is determined for a number of beam directions, allowing beam directions to be selected for maximum robustness in treatment planning.

18 Claims, 3 Drawing Sheets

(56) References Cited

U.S. PATENT DOCUMENTS

2019/0336790 A1* 11/2019 Traneus ................. G16H 20/40

OTHER PUBLICATIONS

Chen, Wei, et al., "Including Robustness in Multi-criteria Optimization for Intensity Modulated Proton Therapy," Phys Med Biol. Feb. 7, 2012; 57(3): 591-608.
Liu, Wei, et al., "Robust optimization of intensity modulated proton therapy," Med. Phys. 39 (2), Feb. 2012, pp. 1079-1091.
First Examination Report issued Aug. 8, 2022 in Indian Patent Application No. 202017047047 (with English translation).

* cited by examiner

SYSTEM, COMPUTER PROGRAM PRODUCT AND METHOD FOR ION-BASED RADIOTHERAPY TREATMENT PLANNING

This application is the National Stage of International Application No. PCT/EP2019/062377, filed May 14, 2019, and claims benefit of European Patent Application No. 18173400.5, filed May 21, 2018, the entire contents of which are incorporated by reference herein.

TECHNICAL FIELD

The present invention relates to determining robustness in ion-based radiotherapy treatment planning and the selection of beam directions in ion-based radiotherapy treatment planning.

BACKGROUND

It is important to evaluate the quality of a radiotherapy treatment plan, to ensure that it will be delivered correctly and affect the patient in the desired way. The delivery of a radiotherapy treatment plan to a patient is affected by a number of factors, an important one being the patient's own anatomy. Structural variations in the patient's body will lead to scattering of particles, altering their path and therefore affecting the resulting dose distribution. The density of the structures traversed by the ion will also affect the path length.

In ion-based radiotherapy each ion will emit most of its energy towards the end of its path, creating what is known as the Bragg peak. A key issue in treatment planning is to ensure that the Bragg peaks of all beams are placed within the treatment volume, in such a way that all parts of the treatment volume receive the prescribed dose while minimizing dose to the surrounding volume.

The position of the Bragg peak is affected by the kinetic energy Tp of each ion and by the properties of the tissue traversed by the ion. The values for Tp are selected so that the ions having the lowest energy will stop close to the nearest end of the treatment volume and the ions having the highest energy will stop close to the farthest end of the treatment volume, as seen from the radiation source. If there is a setup change, for example, if the patient moves so that the ion will traverse a different type of tissue, this will affect the position of the Bragg peak, which will in turn cause an error in the delivered dose.

In radiotherapy treatment, radiation is normally provided from a number of different directions around the patient, to maximize the dose to the target while keeping the dose to surrounding tissue low. An important part of dose planning is selecting appropriate beam directions.

Both the geometrical path length and the Water Equivalent Path Length (WEPL) are of interest in dose planning. The WEPL is defined as the distance that is equivalent to that measured in water, taking into account the densities of the tissues traversed by the ion and the variation of stopping power ratio between water and the traversed media. It is usually calculated as the product of the distance in the considered materials times the density times the water to medium stopping power ratio. Several methods for determining the water equivalent path length are known. Some dose engines, for example, the Monte Carlo dose engine, have functions for calculating the WEPL as a part of dose planning. Both the geometrical path length and the WEPL may be affected by setup errors. The geometrical path length may be affected in particular where the part of the patient's body where the beam enters has an irregular shape, such as the ear. The WEPL will be affected both by irregular shape and by variations in tissue density. The path length is most easily determined along a straight line from the entry point to the voxel concerned. More realistically, however, the path will not be a straight line. An alternative way of determining the path length, therefore, is based on the average path length value of all simulated trajectories passing through the voxel. This is valid both for the geometrical path length and for the WEPL.

There is always an amount of uncertainty in dose planning, since factors such as CT calibration, tissue inhomogeneity, organ motion and deformation cannot be controlled. Because of such uncertainty factors there is a desire for a plan to be as robust as possible, meaning that it should provide the same dose distribution even if some factor changes. It is also important to evaluate the quality of a radiotherapy treatment plan, to ensure that it will be delivered correctly and affect the patient in the desired way. When evaluating a radiotherapy treatment plan, its robustness is a key factor. The robustness reflects how well the plan will work in the case of small changes to the setup. For example, if the patient receiving the treatment moves relative to the assumed position this will affect where the particles will stop and thereby also the treatment. If the tissue type traversed changes as a result of the movement, the effect on the path length may be significant. Therefore, plans involving areas with high tissue inhomogeneity will generally be less robust than plans involving areas with the same or similar tissue type. A plan is said to be robust if a change in any of the above factors will not change the dose. There is a constant desire to provide treatment plans that are as robust as possible, and also to evaluate the robustness of calculated treatment plans.

SUMMARY

It is an object of the present invention to provide a method of evaluating the robustness of a treatment plan.

The invention relates to a method for use in computer-based radiotherapy treatment planning for ion based radiotherapy, comprising the steps, performed in a processor, for a selected beam direction and for each of at least a first and a second portion in a treatment volume, of,
- obtaining information related to accumulated path length of tissue traversed by ions when they reach the portion,
- calculating a quantity value representative of the accumulated path length,
- using the quantity values for the first and second portion as an input value for treatment planning.

The inventive method is useful for determining the robustness of a radiotherapy treatment plan that has already been computed. In that case the step of using the quantity value involves determining the plan's robustness in inverse dependence of the path length variations for the beam directions used in the plan.

The variations in accumulated path length associated with a particular beam direction are an indicator of how robust a treatment plan using this particular beam direction can be. A beam direction having uniform accumulated path lengths across the beam indicates tissue homogeneity and will be more robust than a beam direction for which the accumulated path lengths vary across the beam. In accordance with this, the step of using the quantity value may involve selecting beam directions as part of treatment planning. Hence, the method enables the selection of suitable beam directions which will enable the generation of a robust treatment plan. This will be discussed in more detail below.

The portion of the volume is typically a voxel, but it may also be defined in another suitable way, for example, as a group of voxels. To provide an indication of the quality of the plan for the whole volume, preferably all voxels in the volume, or in the relevant part of the volume, are considered, either individually or in groups.

The accumulated path length considered may be a geometrical path length. This will allow the patient's geometry to be considered, in particular any irregular shapes in the area where the beam enters the patient. In a preferred embodiment the accumulated path length is a Water Equivalent Path Length, WEPL. In this case, the geometry of the patient as well as the densities of the tissues traversed by each particle will be considered.

The information related to the quantity values for ions that reach the portion of the treatment volume preferably includes a value indicating an average of the path lengths traversed by at least two ions that will reach the portion of the treatment volume. Alternatively, the information related to the quantity values may be related to only one particle. It may also be calculated for the shortest path between the entry point and the voxel concerned.

The accumulated path length is preferably computed and reported over the whole volume covered per beam, for all voxels in the volume or for a representative selection of voxels, for example every other voxel or every nth voxel, n being a suitable integer.

The method preferably further comprises the step of displaying, in an image of the treatment volume, for each of the first and the second portion of the treatment volume, information representing the quantity value, to provide a visual indication of the robustness.

One preferred way of displaying the information is by means of a colour scheme where colours are assigned to path length values. In this case, each quantity value is assigned a colour and the step of displaying information representing the accumulated path length includes displaying a representation of the treatment volume, where each of the at least first and second portions of the treatment volume is displayed in the colour representing the path length calculated for that portion of the treatment volume.

Another feasible way of displaying the information would be to assign an elevation level to each quantity value displaying information representing the path lengths includes displaying a 3-dimensional representation of the treatment volume, where each of the at least first and second portions of the treatment volume is displayed at the elevation level representing the path length calculated for that portion of the treatment volume.

Alternatively, the distribution may be displayed in the form of a set of lines, or planes, through voxels having the same path length value. If the lines or planes are smooth and perpendicular to the beam direction, this will mean that the plan is robust. If the lines are irregular, this will indicate that a small change, for example, a movement of the patient, may significantly affect the dose.

To facilitate the calculations, preferably a dose calculation engine that will obtain the relevant path length information for each voxel as part of the calculation is used, as this will allow the calculations according to the invention to be performed with virtually no additional computational effort. A dose calculation engine providing such information regarding WEPL and geometrical path length is the Monte Carlo engine. Since the quantity value in this case is determined from a Monte Carlo propagation through the upstream anatomy, only the region traversed by particles that reach the respective voxel is considered. The region considered for each target voxel is sampled in an optimally importance weighted manner with respect to where the ion traverses.

When using the quantity value as input to treatment planning, the steps of obtaining information and calculating the quantity value are performed for two or more beam directions, which will provide input data for selecting beam directions to use in the treatment plan. When applying the method in treatment planning, the robustness of each of at least two possible beam directions is determined by performing the steps of obtaining information and calculating a quantity value for each of the at least two possible beam directions and selecting at least one beam direction to be used in the treatment among the possible beam directions in dependence of their determined robustness. The more suitable beam directions will be the ones where the WEPL distribution indicates that a small setup error will not affect the dose. In this way, the method according to the invention also provides input data for radiation treatment planning, which will help make the resulting plan more robust.

The selection of the at least one beam direction may be performed manually by an operator. In that case, a number of beam directions are considered and data indicating the variations in path length for each of the beam directions is displayed. The operator can then select beam directions for which the path length variations are acceptable and/or avoid beam directions having too great path length variations.

Alternatively, the selection is made as part of a computer-implemented optimization. In this case, the optimization problem should include a penalty on the path length variations, that will lead to the selection of beam directions having the best values with respect to path length variations.

The invention also relates to a computer program product comprising computer readable code means which, when executed in a computer, will cause the computer to perform the method as outlined above. The invention also relates to a non-transitory computer readable medium encoded with computer executable instructions which, when run in a first computer device will cause the device to perform the method. The invention also relates to a computer system comprising a processor, a data memory and a program memory, wherein the program memory comprises a computer program product or a non-transitory computer readable medium as defined above.

BRIEF DESCRIPTION OF THE DRAWINGS

The invention will be described in more detail in the following, by way of example and with reference to the appended drawings, in which.

DETAILED DESCRIPTION

Figure 1:
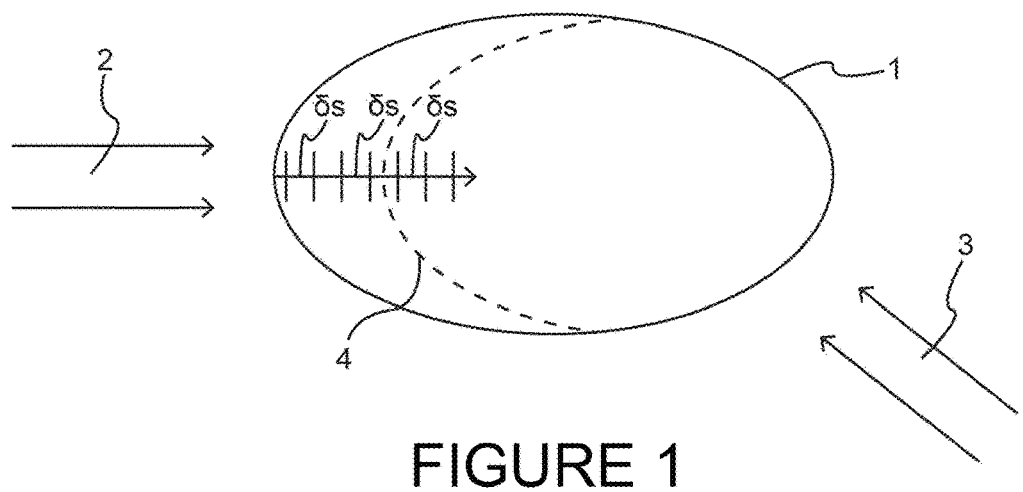
FIG. 1 illustrates the path of a beam through a patient from a first and a second beam direction, respectively.

FIG. 1 illustrates schematically the accumulation of path length. A simplified section 1 through a patient is shown, and two beams of charged particles: a first beam 2 horizontally entering the patient from the left-hand side of the Figure and a second beam 3 entering the patient from the lower right corner of the Figure. As the particles traverse through the patient, they will traverse different types of tissue, which is not indicated in FIG. 1. The geometrical path length is only dependent on the geometrical distance traversed by the particle. A dashed line 4 illustrates a uniform geometrical depth in the patient in the beam direction, that is, following the outer contour of the patient. The Water Equivalent Path Length WEPL is affected by the geometrical distance traversed by the particles and by the type of tissue traversed, in particular the density of the tissue.

As illustrated for the first beam 2, the path of the particle through the patient is divided into portions δs. For clarity, the portions are disproportionally big, and only a few of them are labelled. A typical value for δs is 2 mm. Typically each portion corresponds to the path through one voxel, since this will enable the use of values already calculated in the dose engine, but other divisions may be used if feasible. The path length for one particle reaching a particular voxel is the sum of the path length values δs through all the voxels upstream of it, that is the voxels traversed by the particle to reach the particular voxel. As noted above, the path for one particle is typically not a straight line.

The geometrical path length is the distance from the particle's entry point into the patient, to the voxel concerned. This will normally be quite evenly distributed but may take on more complex forms in areas where the patient's contour is irregular, for example, where a beam traverses the ear.

The WEPL may be calculated based on data per voxel accumulated during a forward MC dose calculation. When implementing the method according to the invention in a Monte Carlo dose engine, during a Monte Carlo dose calculation, the WEPL is accumulated per beam in every voxel that is traversed by a proton. After finishing the dose calculation, the 3D distribution of the average WEPL per voxel is calculated.

Figure 2A:
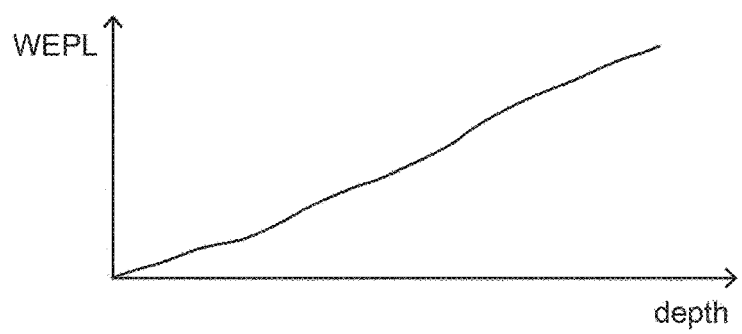
FIG. 2a illustrates the water equivalent path length through a patient and FIG. 2b illustrates the variation in water equivalent path length across the patient.

FIG. 2a is a schematic diagram of the WEPL depth profile for the first beam 1 of FIG. 1. As can be seen the WEPL increases essentially linearly with increasing depth into the patient, indicating near homogeneous tissue in this simplified example. If the tissue is more inhomogeneous the curve will be less straight.

Figure 2B:
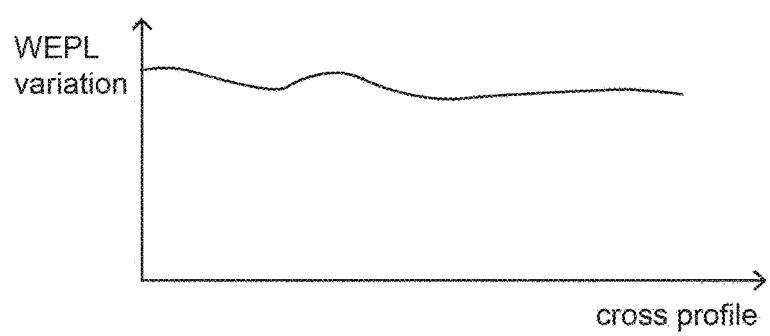

FIG. 2b is a schematic diagram of the variation of WEPL along a cross profile through the patient (i.e. perpendicular to the beam direction) as seen in one particular beam direction. The WEPL cross profile shows the WEPL values along the voxels at a particular depth in the patient. When considering the first beam 2 in FIG. 1, the WEPL cross profile will be vertical through the patient, perpendicular to the beam direction. The irregularity of the curve increases with increasing variation in tissue density across the patient and is an indicator of suitability of the beam direction for use in a radiotherapy treatment plan. An irregular curve is a sign that the beam direction will result in a less robust plan. A smooth curve is a sign that the beam direction may yield a robust plan in that a movement of the patient will not significantly affect the delivered dose.

Figure 3A:
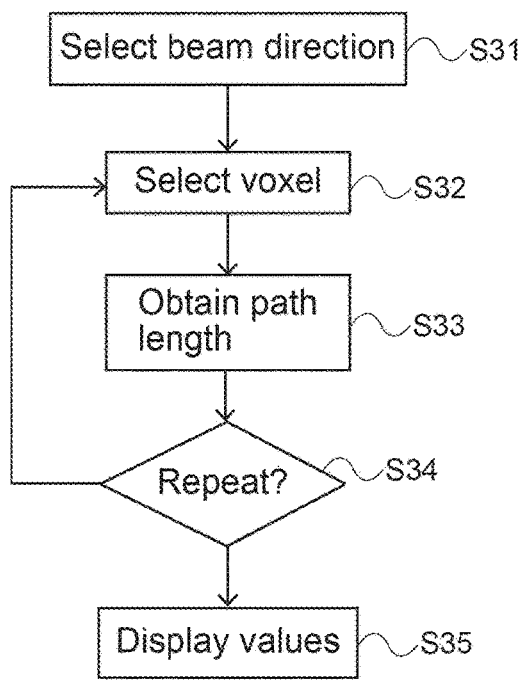
FIGS. 3a and 3b are flow charts of methods constituting embodiments of the invention.

FIG. 3a is a schematic flow chart of a method for determining plan robustness according to the invention. In a first step S31 a beam direction used in the plan is selected. As mentioned above, the path length for each voxel is dependent on the beam direction, as both the geometrical distance from the point where the beam enters the patient to the voxel considered and the tissue type traversed, will be different for different beam directions.

In step S32 a voxel to be considered is selected and in step S33 a path length value representing the average path length traversed for particles reaching this voxel is calculated. The particles may stop in the voxel concerned or may continue to travel through the patient's body. The important thing is the accumulated path length upstream of the voxel. The path length may be the geometrical path length, or it may be the WEPL. The variation in geometrical path length will indicate how much the patient geometry will affect the treatment, in particular how irregular the patient's surface is around the entry point. The variation in WEPL will indicate the effect of both patient geometry and variations in tissue type.

The geometrical path length as well as the WEPL values may in many cases be obtained directly from the dose engines. For example, the Monte Carlo dose engine already calculates the geometrical path length and WEPL values for all voxels.

Step S34 is a decision step to determine if path length should be determined for more voxels. If yes, the procedure reverts to step S32, if no, the procedure continues with step S35. It should be understood that steps S32-S34 are shown for illustrative purposes. In the typical case, a number of voxels in the patient volume that is affected by the beam will be selected and the path lengths for all voxels will be provided in parallel. The voxels may be all voxels in the relevant patient volume, or may be a selection of voxels. For example, a sub-volume of the patient may be selected. Alternatively, or in addition to selecting a sub-volume, it may be decided to obtain values for only one voxel or for a number of voxels, which are preferably evenly distributed across the sub-volume, for example every second or third voxel.

When all path length values that should be displayed have been obtained, they are displayed, in step S35, typically superimposed on the image of the patient. The values may be displayed as a line in a 2D image, or as colour coded plane in 3D. The display will be indicative of the robustness of a plan using the beam direction. Of course, the method may be performed, and resulting data displayed, for more than one beam direction used in the plan.

Figure 3B:
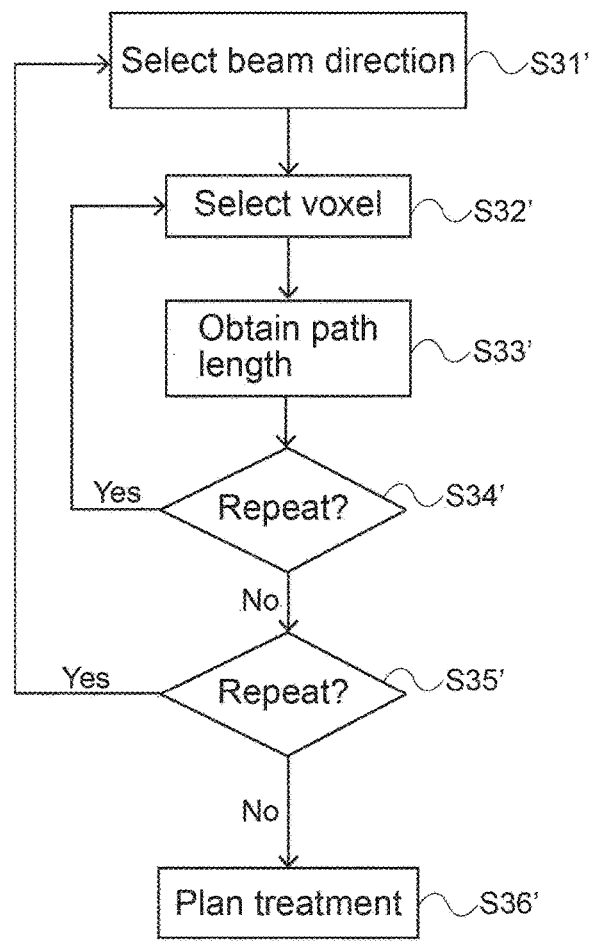

The method may also be used for treatment planning, to select suitable beam directions to be used in treatment, as shown in FIG. 3b. In that case, step S31' involves selecting a beam direction that is considered for use in the plan. Steps S32', S33' and S34' are analogous to steps S32-34 of FIG. 3a. In this embodiment, the method is performed a number of times for different beam directions. This is indicated by step S35' which enables the return to step S31' to consider another beam direction. The beam directions displaying smooth iso-WEPL curves for lines indicating the same path length, or smooth parallel fields of voxels having the same path length, will be more robust than beam directions for which the curves are uneven. When no more beam directions are to be considered, the method proceeds to step S36', in which the results are used. Based on the results of the method performed for several beam directions, beam directions that enable a robust plan may be selected.

The selection may be performed manually by an operator selecting one or more beam directions. In this case, step S36' involves displaying the data in a similar way to S35, to enable the operator to make the selection. Alternatively, the result may be used in step S36' for an automatic planning algorithm arranged to place a penalty on path length variations. How to achieve this is well known to the person skilled in the art, and typically includes an objective function designed to limit the path length variations, or a constraint on the maximum allowed path length variations.

Figure 4A:
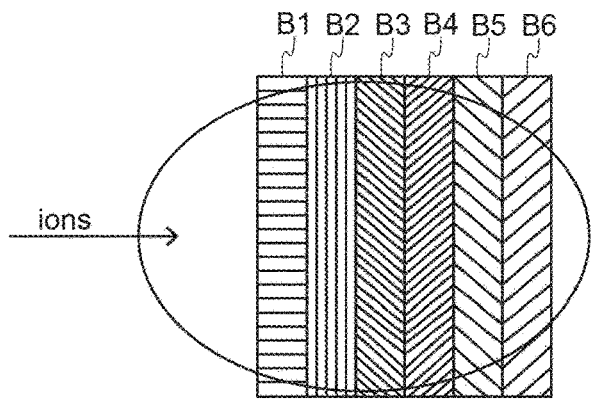
FIGS. 4a and 4b illustrate the path length variations in the form of iso-WEPL curves.
Figure 4B:
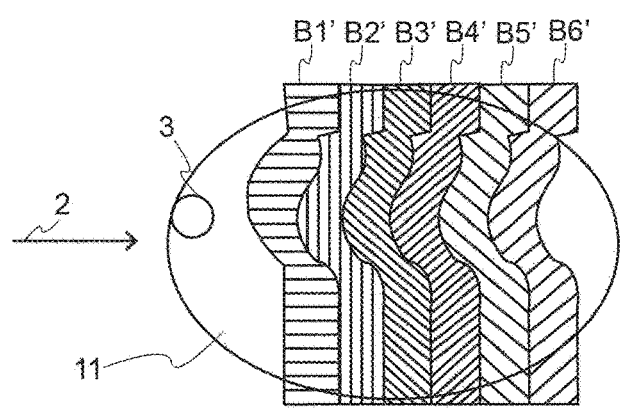

The shape of the WEPL depth profile or the iso-WEPL plane is an indication of the robustness of a plan using the beam direction selected in step S31. Iso-WEPL lines are lines through voxels having the same WEPL or WEPL values within an interval FIGS. 4a and 4b illustrate iso-WEPL bands for two different situations. FIG. 4a shows the distribution of the WEPL in a treatment volume 1, in an ideal situation, where the ions pass through a completely homogenous medium with a flat external surface. The direction of the incoming ions is perpendicular to the surface of the medium as indicated by the horizontal arrow. The six different iso-WEPL curves B1-B6 are identified by different patterns: horizontal lines, vertical lines, and four different patterns of diagonal lines. Each iso-WEPL curve forms a band of WEPL values throughout the treatment volume substantially parallel to the surface of incidence of the ions, although they are shown as straight lines for simplicity. This illustrates that all voxels at the same geometrical path length in the direction of the beam will also be associated with essentially the same WEPLs.

FIG. 4b shows the distribution of the path length in a somewhat more realistic patient volume. There is a low density region 3, such as an air cavity, which is in the path 2 of the ions. This will cause ions traversing the low density region to experience a shorter WEPL contribution in that region than ions travelling the same geometrical distance through other types of tissue. Therefore, the path lengths in and around the air cavity 3 will take on a more irregular shape in the anatomical image, as illustrated by the iso-WEPL curves B1'-B6'. As can be seen, there is a ripple, caused by the ions propagating through the low-density volume 3.

Images such as the ones in FIGS. 4a and 4b provide an indication of the regularity of the WEPLs experienced by the ions propagating through the volume. A high amount of ripple or irregular shape of the WEPL bands indicates a lower robustness of the plan, in that a small movement of the patient, or other change to the setup, may cause a significant variation in the dose distribution actually delivered to the patient. The geometrical path length may be displayed in the same way as shown in FIGS. 4A and 4B.

Figure 5:
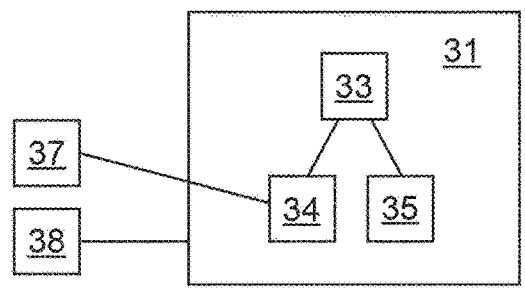
FIG. 5 is a schematic representation of a computer system in which the method may be implemented.

FIG. 5 is a schematic representation of a computer system in which the inventive method may be performed. A computer 31 comprises a processor 33, a data memory 34 and a program memory 35. Preferably, a user input means 37, 38 is also present, in the form of a keyboard, a mouse, a joystick, voice recognition means or any other available user input means. The user input means may also be arranged to receive data from an external memory unit.

A treatment plan to be evaluated is found in the data memory 34. The treatment plan may be generated in the computer 31, or received from another storage means in any way known in the art.

The data memory 34 also holds deposited ion path length information for each voxel. As will be understood, the data memory 34 is only shown schematically. There may be several data memory units, each holding one or more different types of data, for example, one data memory for the treatment plan, one for the CT scans, etc., The program memory 35 holds a computer program arranged to control the processor to perform the plan evaluation according to the invention.

The invention claimed is:

1. A computer-based method for treatment planning of a radiotherapy treatment plan for ion based radiotherapy, performed in a processor, for a selected beam direction, comprising:
    obtaining, by the processor, information for each of at least a first and a second portion in a treatment volume, related to accumulated path length of tissue traversed by ions when they reach the portion;
    calculating, by the processor, an accumulated path length for each of the at least first and second portion;
    selecting, by the processor for use in a radiotherapy treatment plan for ion based radiotherapy, a beam direction based on each of the calculated accumulated path lengths for the first and second portion in a treatment portion; and
    communicating, by the processor, the selected beam direction to a radiation therapy system for performing the ion based radiotherapy, the ion based radiotherapy to be performed by the radiation therapy system using the at least one radiotherapy treatment plan.

2. The method according to claim 1, wherein the accumulated path length is a Water Equivalent Path Length, WEPL.

3. The method according to claim 1, wherein the accumulated path length is a geometrical path length.

4. The method according to claim 1, wherein the information related to the accumulated path length of tissue traversed by ions when they reach the portion includes a value indicating an average of the accumulated path lengths traversed by at least two ions that will reach the portion of the treatment volume.

5. The method according to claim 1, further comprising:
    calculating the accumulated path lengths for each of at least two beam directions;
    determining each of the at least two possible beam directions including a first beam direction a second beam direction based on the calculated accumulated path lengths for each of the at least two beam directions; and
    selecting at least one of the first beam direction and the second beam direction to be used in the treatment among the possible beam directions in dependence of their calculated accumulated path lengths.

6. The method of ion-based radiotherapy treatment planning according to claim 5, wherein the selection is made as part of a computer-implemented optimization.

7. A computer program product comprising non-transitory computer readable code means which, when executed in a computer, will cause the computer to perform the method according to claim 1.

8. A computer system comprising a processor, a data memory, and a program memory, wherein the program memory comprises a computer program product according to claim 7.

9. A non-transitory computer readable medium encoded with computer executable instructions which, when run in a first computer device will cause the device to perform the method according to claim 1.

10. A computer-based method for treatment planning of a radiotherapy treatment plan for ion based radiotherapy, performed in a processor, for a selected beam direction, comprising:
    obtaining, by the processor, information for each of at least a first and a second portion in a treatment volume, related to accumulated path length of tissue traversed by ions when they reach the portion;

calculating, by the processor, an accumulated path length for each of the at least first and second portion of at least two beam directions, the at least two possible beam directions including a first beam direction a second beam direction;

selecting, for use in a radiotherapy treatment plan for ion based radiotherapy, at least one of the first beam direction and the second beam direction to be used in the treatment among the possible beam directions in dependence of their calculated accumulated path lengths for the first and second portion in a treatment portion, wherein the selection of the at least one beam direction is performed by an operator;

displaying, by the processor in an image of the treatment volume, for each of the first and the second portion of the treatment volume, information representing the calculated accumulated path length; and communicating, by the processor, the selected beam direction to a radiation therapy system for performing the ion based radiotherapy, the ion based radiotherapy to be performed by the radiation therapy system using the at least one radiotherapy treatment plan.

11. The method according to claim 10, wherein each calculated accumulated path length is assigned a colour and the step of displaying information representing the calculated accumulated path length that includes displaying a representation of the treatment volume, where each of the at least first and second portions of the treatment volume is displayed in the colour representing the accumulated path length calculated for that portion of the treatment volume.

12. The method according to claim 10, wherein each calculated accumulated path length is assigned an elevation level and the step of displaying information representing the calculated accumulated path length that includes displaying a 3-dimensional representation of the treatment volume, where each of the at least first and second portions of the treatment volume is displayed at the elevation level representing the accumulated path length calculated for that portion of the treatment volume.

13. The method according to claim 10, wherein the accumulated path length is a Water Equivalent Path Length, WEPL.

14. The method according to claim 10, wherein the accumulated path length is a geometrical path length.

15. The method according to claim 10, wherein the information related to the accumulated path length of tissue traversed by ions when they reach the portion includes a value indicating an average of the accumulated path lengths traversed by at least two ions that will reach the portion of the treatment volume.

16. A computer program product comprising non-transitory computer readable code means which, when executed in a computer, will cause the computer to perform the method according to claim 10.

17. A computer system comprising a processor, a data memory, and a program memory, wherein the program memory comprises a computer program product according to claim 16.

18. A non-transitory computer readable medium encoded with computer executable instructions which, when run in a first computer device will cause the device to perform the method according to claim 10.

* * * * *